US009979183B2

United States Patent
Tornila Oliver et al.

(10) Patent No.: US 9,979,183 B2
(45) Date of Patent: May 22, 2018

(54) OVER VOLTAGE PROTECTION CIRCUIT

(71) Applicant: NXP B.V., Eindhoven (NL)

(72) Inventors: Jaume Tornila Oliver, Eindhoven (NL); Arnoud Pieter van der Wel, Eindhoven (NL); Matthieu Deloge, Eindhoven (NL)

(73) Assignee: NXP B.V., Eindhoven (NL)

( * ) Notice: Subject to any disclaimer, the term of this patent is extended or adjusted under 35 U.S.C. 154(b) by 115 days.

(21) Appl. No.: 14/810,228

(22) Filed: Jul. 27, 2015

(65) Prior Publication Data
US 2017/0033556 A1    Feb. 2, 2017

(51) Int. Cl.
*H02H 3/20* (2006.01)
*H02H 9/04* (2006.01)

(52) U.S. Cl.
CPC .............. *H02H 9/04* (2013.01); *H02H 3/20* (2013.01)

(58) Field of Classification Search
CPC ............. H02H 9/04; H02H 3/20; H02H 9/041
USPC ........................................................ 361/91.1
See application file for complete search history.

(56) References Cited

U.S. PATENT DOCUMENTS

| 6,933,764 | B2 | 8/2005 | Devin | |
|---|---|---|---|---|
| 7,714,553 | B2 * | 5/2010 | Lou | G05F 1/563 323/268 |
| 8,692,529 | B1 * | 4/2014 | Wyatt | G05F 1/56 323/270 |
| 2004/0174649 | A1 * | 9/2004 | Ito | B60R 21/017 361/91.1 |
| 2014/0375376 | A1 * | 12/2014 | Genest | H03K 17/162 327/382 |

FOREIGN PATENT DOCUMENTS

| CN | 204046886 U | 12/2014 |
|---|---|---|
| JP | 2000305639 A | 11/2000 |

OTHER PUBLICATIONS

Extended European Search Report for Patent Appln. No. 16180999.1 (dated Dec. 13, 2016).
Linear Technology Corporation "Surge Stopper", 2 pgs.
Linear Technology Corporation "LT4356-3 Datasheet, Surge Stopper with Fault Latchoff", 24 pgs. (2009).
Linear Technology Corporation "Overvoltage Surge Protectors", 2 pgs.
Maxim Integrated Products, Inc. "MAX16126/MAX16127 Datasheet, Load-Dump/Reverse-Voltage Protection Circuits", 19 pgs. (Mar. 2015).
Fernandez, E. et al. "Low Power Voltage Limiter Design for a Full Passive UHF RFID Sensor", IEEE 54th Intl. Midwest Symp. on Circuits and Systems, 4 pgs. (2011).

* cited by examiner

*Primary Examiner* — Dharti Patel
(74) *Attorney, Agent, or Firm* — Rajeev Madnawat

(57) ABSTRACT

An overvoltage protection circuit is disclosed. The overvoltage protection circuit includes an input voltage port, an output voltage port, a low pass filter coupled to the input voltage port and a voltage regulator coupled to the low pass filter. The overvoltage protection circuit also includes a transistor having a gate, a drain and a source. The transistor is coupled to the input voltage port and the output voltage port and the gate is coupled to the voltage regulator.

11 Claims, 4 Drawing Sheets

OVER VOLTAGE PROTECTION CIRCUIT

BACKGROUND

Electronic components are typically powered by a constant voltage direct current (DC) power source. These electronic components are specifically designed to be powered with a particular DC voltage, with some margin of error. Any spike, even temporary, in the input voltage may cause permanent component failures. In many industrial or consumer applications, high voltage power supply spikes are common. These spikes may last from a few microseconds to a larger millisecond time values. With ever increasing compactization of electronic components on semiconductor wafers, these components are more prone to failure due to a limited capacity to withstand heat generated by larger current that results from these spikes. Even if the components survive these temporary spikes, there is a possibility that the overall system may not operate reliably during a voltage spike.

Historically, overvoltage and overcurrent protection was achieved using capacitors, diodes and fuses. However, these solutions require excessive amount of space. In todays market where even small devices provide great number of functions and features, a lot of circuitry need to be fabricated in a rather small space. Therefore, these traditional overvoltage protection methods have become unsuitable for many, if not all, applications. There are also other types of circuits available for overvoltage protection. But, those circuits are typically include a rather large number of components and consume more power. Further, some of these circuits are not suitable to handle short duration spikes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, overvoltage protection circuit is disclosed. The overvoltage protection circuit includes an input voltage port, an output voltage port, a low pass filter coupled to the input voltage port and a voltage regulator coupled to the low pass filter. The overvoltage protection circuit also includes a transistor having a gate, a drain and a source. The transistor is coupled to the input voltage port and the output voltage port and the gate is coupled to the voltage regulator.

In one or more embodiments, the low pass filter includes a resistor and a capacitor and the voltage regulator includes a voltage divider. The voltage regulator further includes an operational amplifier coupled to the voltage divider at a first input and a reference voltage input at a second input. The voltage regulator further including a regulator transistor that is coupled to an output of the operational amplifier. The voltage divider includes at least two resistors having values that depend on a selection of a value of the reference voltage. The transistor is a common source transistor.

In another embodiment, a method for providing overvoltage protection is disclosed. The method includes feeding an input voltage to a drain of a source follower transistor, feeding the input voltage to a low pass filter, generating a first drive signal from an output of the low pass filter, generating a second drive signal using the first drive signal and driving the source follower transistor with the second drive signal. The generation of the first drive signal includes using a reference voltage and an operational amplifier and the generation of the second drive signal includes sinking current in a transistor that is coupled to a gate of the source follower transistor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
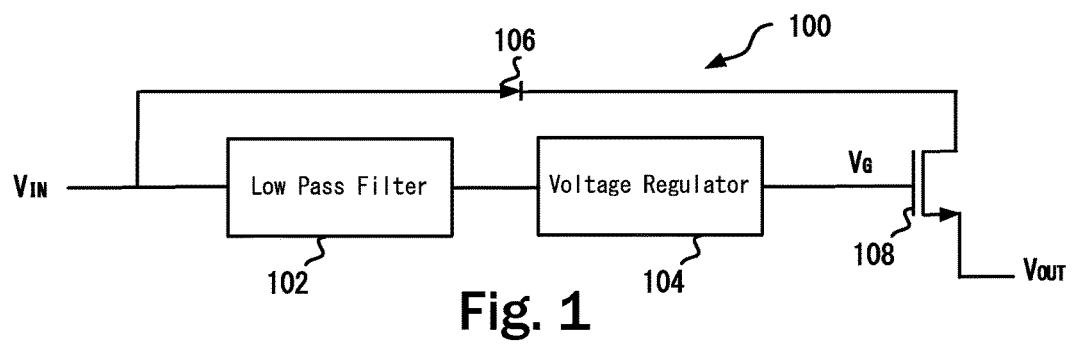
FIG. 1 shows a schematic of an overvoltage protection circuit in accordance with one or more embodiments of the present disclosure.

FIG. 1 shows a schematic of an overvoltage protection circuit 100. The overvoltage protection circuit 100 can be used for a variety of applications. However, due to its simplicity and low power consumption, the overvoltage protection circuit 100 is ideal for low voltage and energy efficient applications. It should be noted that some prior art solutions achieve fast operations by burning power whereas the embodiments of the overvoltage protection circuit 100 described herein burns comparatively very little power. Therefore, low power transistors can be used in the overvoltage protection circuit 100.

Traditional voltage protection circuits are typically power hungry because the circuitry that drives a pass transistor needs to be fast enough against fast occurring voltage spikes in the input supply voltage. The overvoltage protection circuit 100 includes a low pass filter (LPF) 102 to obtain a high power supply rejection ratio (PSRR) and to overcome a need for a high speed operational amplifier. In some embodiments, the operational amplifier needs to be faster (delay between input and output) than the LPF 102. The PSRR is defined as the ratio of the change in supply voltage in the operational amplifier to the equivalent (differential) output voltage it produces.

The overvoltage protection circuit 100 may optionally include a diode 106 or an equivalent component or circuit to prevent reverse flow of current in case of a drop in $V_{IN}$ below $V_{OUT}$. The overvoltage protection circuit 100 also includes a transistor 108. The transistor 108 may be a source follower transistor or arrangement. The overvoltage protection circuit 100 may include some other components such as in some embodiments there may be a resistor coupled to the ground and $V_{OUT}$. Such additional components are well within the knowledge of a person skilled in the art.

Figure 2:
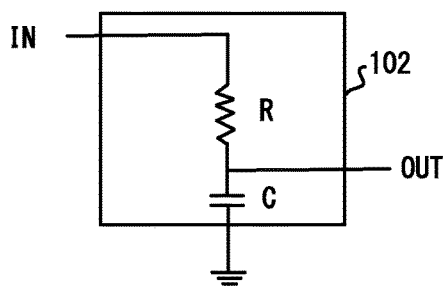
FIG. 2 illustrates a simple passive low pass filter in accordance with one embodiment of the present disclosure.

In some embodiments, the LPF 102 may be a passive RC filter as shown in FIG. 2. As shown, the LPF 102 includes a resistor (R) and a capacitor (C). In other embodiments, the LPF 102 may be a RLC filter or an active low pass filter including an operational amplifier. For voltage signals, the LPF 102 attenuates high frequencies spikes in the input signal $V_{IN}$. However, the LPF 102 has little attenuation below the cutoff frequency determined by its RC time constant. When a spike is encountered in $V_{IN}$, the LPF 102 prevents high frequency part of the spike to pass the LPF 102.

The overvoltage protection circuit 100 includes a voltage regulator 104. In some embodiments, the voltage regulator 104 may be a shunt regulator. A shunt regulator provides a path from the supply voltage towards the ground through a variable resistance. Shunt regulators are simpler than series regulators and sometimes only consist of a zener diode and can be used in very low-powered circuits where the amount of wasted current is too small to be of any concern.

Figure 3:
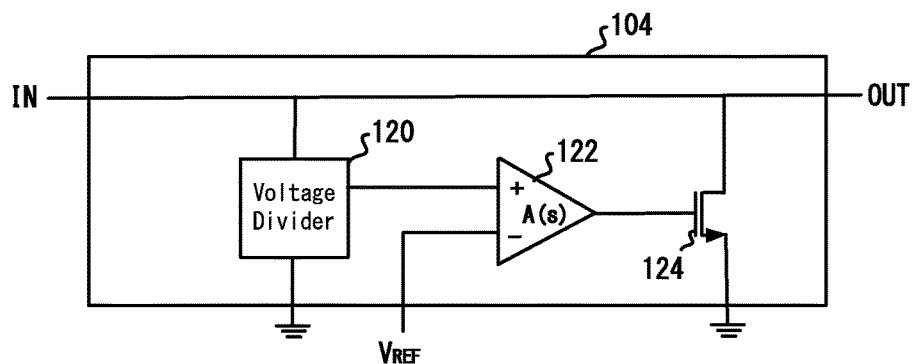
FIG. 3 illustrates a simple voltage regulator in accordance to one of more embodiments of the present disclosure.

In other embodiments, the overvoltage protection circuit 100 uses a voltage regulator 104 as depicted in FIG. 3. The voltage regulator 104 includes a voltage divider 120 coupled to an IN port. The IN port is also coupled directly to the OUT port. The voltage divider 120 divides the voltage at the IN port according to application specific needs, e.g., $V_{IN}$ and $V_{REF}$ values. The voltage regulator 120 is coupled to the first input of an operational amplifier 122. The second input of the operational amplifier 122 is coupled to $V_{REF}$. The operational amplifier 122 acts as an error amplifier and outputs a voltage that is a differential of the voltage being inputted by the voltage divider 120 and $V_{REF}$. As indicated above, the operational amplifier 122 may be a low voltage or conventional operational amplifier. The output of the operational amplifier 122 is coupled to the gate of a transistor 124. The transistor 124 starts to conduct current when a voltage is applied from the operational amplifier 122. This current sink reduces the voltage ($V_G$) at the OUT port of the voltage regulator 104.

The OUT port of the voltage regulator 104 drives the gate of the transistor 108. The transistor 108 provides a source follower arrangement. In one example, the transistor 108 may be a NMOS transistor. The gate terminal of the transistor 108 serves as the input, the source is the output, and the drain is common to both (input and output). The output of the voltage regulator 104 is applied to the gate of the transistor 108. In other embodiments, analogous bipolar common collector configuration transistor may be used. It should be noted that other types of transistors may be used so long as a source follower configuration can be achieved.

In one example, the transistor 108 being a MOS type transistor is advantageous. First, in contrast to passive devices, it can handle a large current and second, it does not require a large bandwidth driving circuit to provide high bandwidth isolation between input and output voltage ports. A combination of MOS type transistor 108 and the LPF 102 handle the large and fast input voltage transients, and the control loop can (a) protect itself against overvoltage, and (b) can be slow, and therefore, low power consumption. Fast response is achieved by the output impedance of the transistor 108 and low power dissipation is achieved by the use of the LPF 102 and the control loop driving the transistor 108 in saturation.

As described above, the overvoltage protection circuit 100 acts as a source-follower, copying the input voltage minus a small voltage drop in the transistor 108, to the output. A filtered version of the input voltage is used to drive the transistor 108. Fast voltage variations in $V_{IN}$ are blocked by the output impedance of the transistor 108 and the LPF 102. Slow variations of the input voltage are blocked by the control loop because $V_G$ is controlled to be lower than the maximum allowed voltage. In some embodiments, if the voltage drop between the drain-source of the transistor 108 needs to be kept low, a charge pump may be used to raise the gate voltage. A charge pump is a type of DC to DC converter that uses capacitors as energy storage elements to create either a higher or lower voltage power source.

Figure 4:
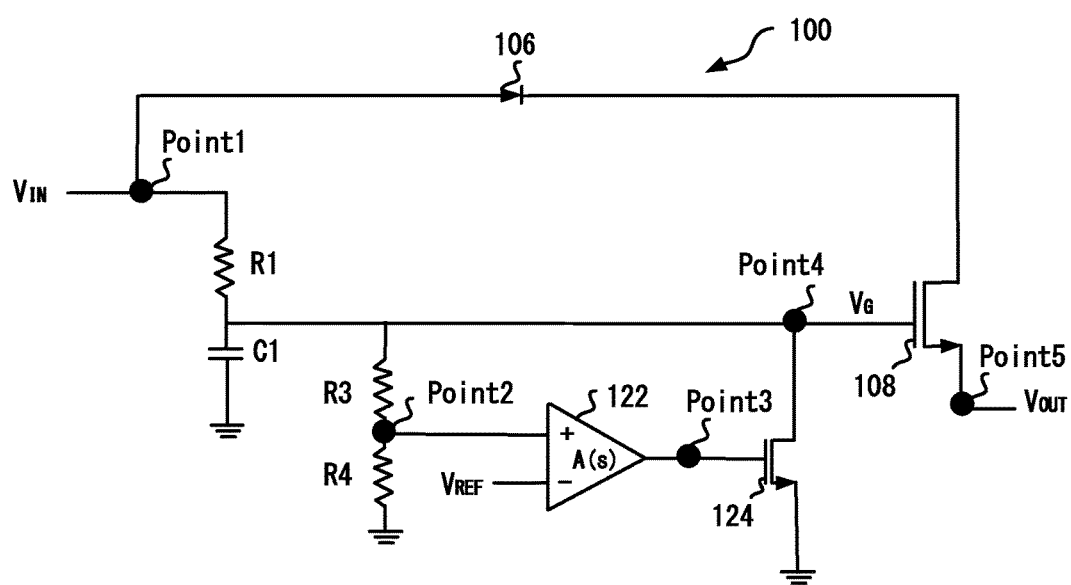
FIG. 4 illustrates an overvoltage protection circuit in accordance with an embodiment of the present disclosure.

FIG. 4 illustrates the overvoltage protection circuit 100 using simple implementations of the LPF 102 and the voltage regulator 104. As shows, the LPF 102 includes a resistor R1 and a capacitor C1. The junction of R1 and C1 is coupled to one end of a voltage divider that includes two resistors R3 and R4. The junction of R1 and C1 is also coupled to the gate of the transistor 108. The junction of R3 and R4 is coupled to the first input of the operational amplifier 122 and the second input of the operational amplifier 122 is coupled to a reference voltage source $V_{REF}$. The operational amplifier 122 amplifies the difference between the voltages at its two inputs. The output of the operational amplifier 122 is coupled to the gate of the transistor 124. An optional diode 106 is coupled between $V_{IN}$ and the transistor 108. In one or more embodiments, the values of R3 and R4 depend on a selection of the value of $V_{REF}$. In other embodiments, $V_{REF}$ may be chosen based on the ratio of R3 and R4.

Figure 5:
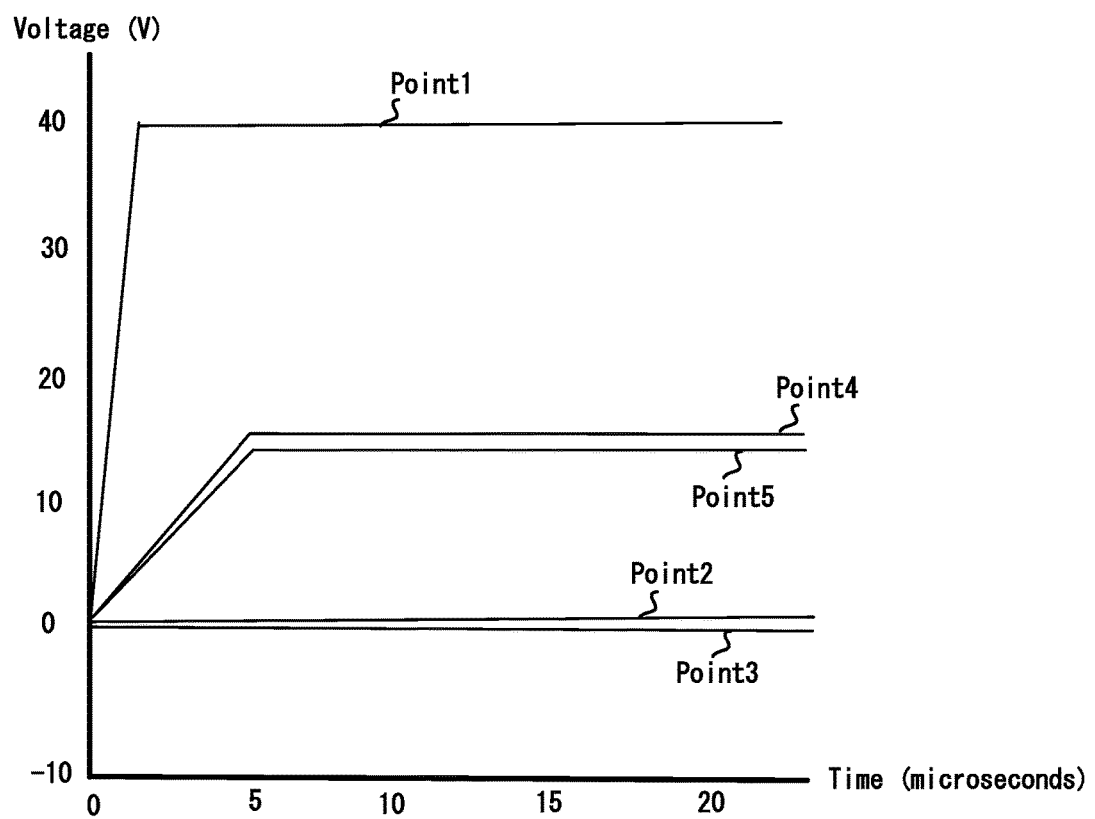
FIG. 5 illustrates a simulation graph to show the functioning of the overvoltage protection circuit depicted in FIG. 1 or FIG. 4.

FIG. 5 illustrates a sample simulation of voltages at various places marked as Point1, Point2, Point3, Point4 and Point5 in FIG. 4. It should be noted that the graph depicted in FIG. 5 is not to scale and even though the lines are being shown as straight lines, in practice, at least some of these lines may not be smooth straight lines at least at some places. The simulation is based on a 40V spike in the input voltage (e.g., at power up), $V_{REF}$ is approximately 1.25V and the voltage divider ratio is approximately 2/21.

As shown, the voltage at Point1 rises to approximately 40V. Voltage at Point2 rises and stabilizes at approximately 1.33V. Voltage at Point3 stabilizes at approximately 790.5 mV. When voltages at Point2 and Point3 stabilizes at these voltages, voltages at Point4 and Point5 stop to increase further and stabilize at approximately 13.95V (Point5) and 14.44V (Point4). Typically, the stabilization of the voltage at Point5 takes approximately 5 microseconds. The desired output voltage is approximately 14V. As shows, the voltage at Point5 remains stable irrespective of the rise in the voltage at Point1.

Figure 6:
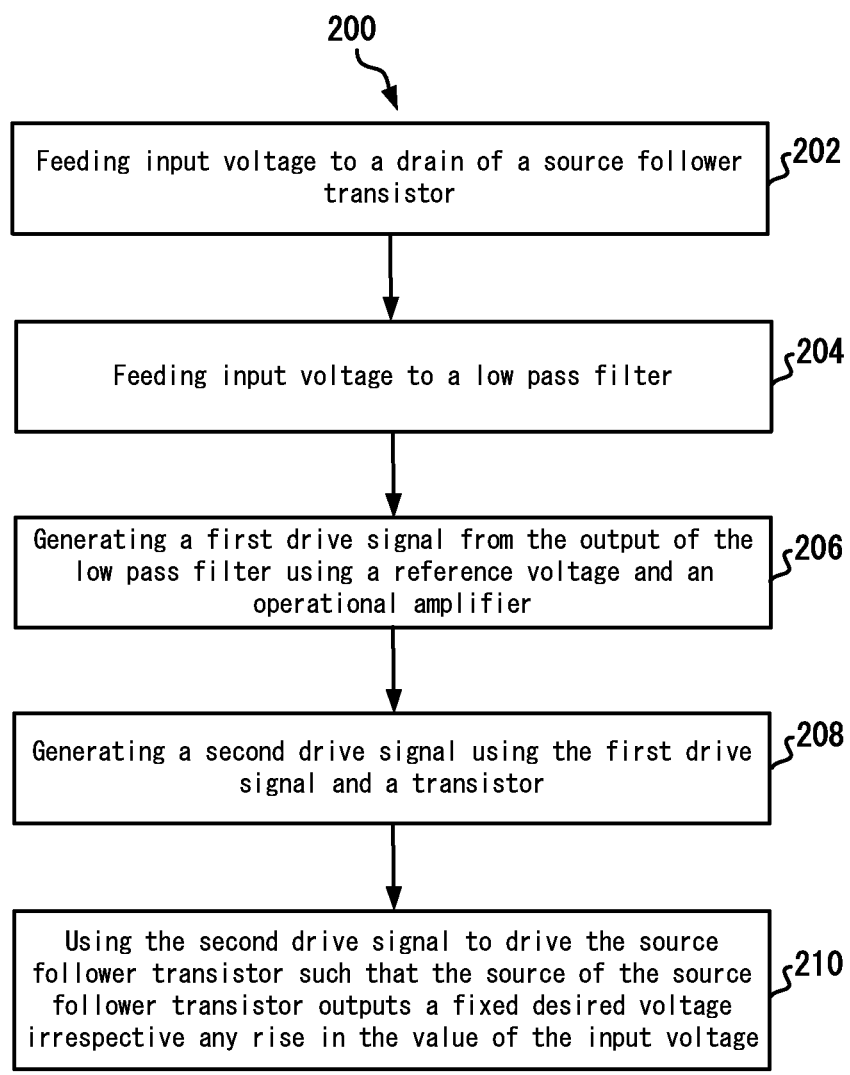
FIG. 6 illustrates a method for generating a drive signal for regulating voltage.

FIG. 6 illustrates a method 200 for regulating voltage. Accordingly, at step 202, an input voltage is applied to a source of a source tracking transistor. At step 204, the input voltage is also applied to a low pass filter. At step 206, a first drive signal is generated from the output of the low pass filter using a reference voltage and a comparator. At step 208, a second driver signal is generated using the first drive signal and a transistor. Then at step 210, the second drier signal is used to drive the source tracking transistor such that the drain of the source tracking transistor outputs a fixed voltage irrespective of any rise in the input voltage.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An over voltage protection circuit, comprising:
   an input voltage port;
   an output voltage port;
   a diode coupled between the input voltage port and the output voltage port to stop a reverse current flow from the output voltage port to the input voltage port;
   a low pass filter coupled to the input voltage port;
   a voltage regulator coupled to the low pass filter; and
   a source follower transistor having a gate, a drain and a source, wherein the drain is coupled to the input voltage port and the source is coupled to the output voltage port and the gate is coupled to the voltage regulator, the source is configured to provide an output voltage at the output port, wherein the voltage regulator is configured, when an input voltage on the input voltage port rises to a predetermined level, to drive the source follower transistor to stabilize the output voltage at a fixed desired voltage, irrespective of any further rise in the value of the input voltage.

2. The over voltage protection circuit of claim 1, wherein the low pass filter includes a resistor and a capacitor.

3. The over voltage protection circuit of claim 1, wherein the voltage regulator includes a voltage divider.

4. The over voltage protection circuit of claim 3, wherein the voltage regulator further includes an operational amplifier coupled to the voltage divider at a first input and a reference voltage input at a second input.

5. The over voltage protection circuit of claim 4, wherein the voltage regulator further including a regulator transistor that is coupled to an output of the operational amplifier.

6. The over voltage protection circuit of claim 4, wherein the voltage divider includes at least two resistors having values that depend on a selection of a value of the reference voltage.

7. The over voltage protection circuit of claim 1, wherein the source follower transistor is a common drain transistor.

8. The overvoltage protection circuit of claim 1, wherein the drain is coupled to the input voltage port and the source is coupled to the output voltage port.

9. A method for providing over voltage protection, the method comprising:
   feeding an input voltage to a drain of a source follower transistor;
   feeding the input voltage to a low pass filter;
   generating a first drive signal from an output of the low pass filter;
   generating a second drive signal using the first drive signal; and
   driving the source follower transistor with the second drive signal such that when an input voltage on the input voltage port rises to a predetermined level, the source follower transistor stabilizes the output voltage at a fixed desired voltage, irrespective of any further rise in the value of the input voltage, wherein the generating the second drive signal includes sinking current in a transistor that is coupled to a gate of the source follower transistor.

10. The method of claim 9, wherein the generating the first drive signal includes using a reference voltage and a comparator.

11. An over voltage protection circuit, comprising:
    an input voltage port;
    an output voltage port;
    a low pass filter coupled to the input voltage port;
    a voltage regulator coupled to the low pass filter, wherein the voltage regulator includes a comparator and a transistor; and
    a source follower transistor having a gate, a drain and a source, wherein the drain is coupled to the input voltage port and the source is coupled to the output voltage port and the gate is coupled to the transistor of the voltage regulator, the source is configured to provide an output voltage at the output port, wherein the voltage regulator is configured, when an input voltage on the input voltage port rises to a predetermined level, to drive the source follower transistor to stabilize the output voltage at a fixed desired voltage, irrespective of any further rise in the value of the input voltage.

* * * * *